June 25, 1957  L. G. SIMJIAN  2,796,801
PROMPTING DEVICE
Filed Dec. 5, 1955  2 Sheets-Sheet 1
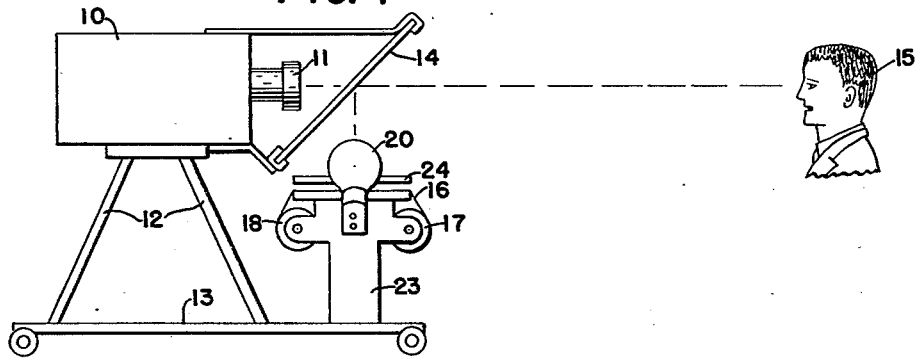
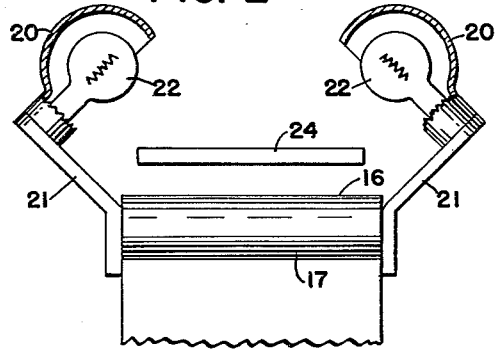
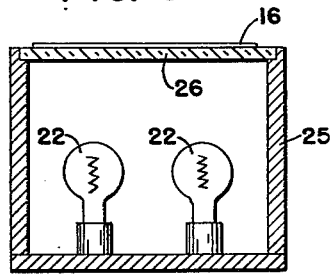
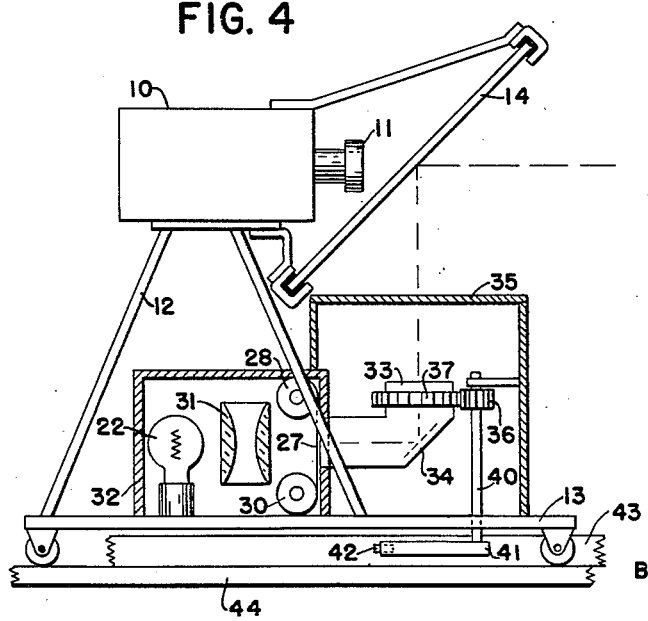
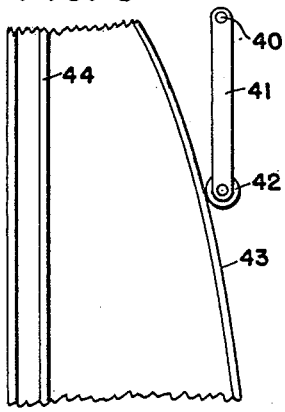
LUTHER G. SIMJIAN
INVENTOR
BY Ralph H. E. Bitner
ATTORNEY June 25, 1957  L. G. SIMJIAN  2,796,801
PROMPTING DEVICE Filed Dec. 5, 1955  2 Sheets-Sheet 2

LUTHER G. SIMJIAN
INVENTOR

BY *Ralph E. Bitner*
ATTORNEY

United States Patent Office 2,796,801
Patented June 25, 1957

2,796,801
PROMPTING DEVICE

Luther G. Simjian, Greenwich, Conn., assignor to The Reflectone Corporation, Stamford, Conn., a corporation of Connecticut Application December 5, 1955, Serial No. 550,951

8 Claims. (Cl. 88—16)

This invention relates to prompting devices and has particular reference to a prompting device for a person who is posing in front of a television pick-up camera or a similar apparatus which takes or transmits intermittent pictures. Visual prompting information is produced in the line of sight of the camera lens and illuminated in a manner which will not interfere with the camera operation.

In the past, placards, greatly enlarged scripts, or other means containing prompting information have been placed in view of the person posing, but outside of the range of the camera. Also, it has become a common practice to project the text of the address to be delivered onto a screen located at the rear of the recording camera thereby enabling the speaker to read a script by looking in the general direction of the pick-up camera.

These means for prompting have not proved satisfactory for obvious reasons. The speaker may look at the placards so intensely for help that the use of such prompting becomes obvious due to the diversion of the speaker's eyes from the camera lens. Furthermore, if the speaker focuses his eyes on a screen located in a plane materially beyond the camera, the personal touch between the speaker and the viewing audience is lost because the viewing audience notices that the speaker's eyes are focused on some remote object.

Semi-transparent mirrors have been used to project graphic information into the line of sight of a speaker and a camera lens but always with the chance that some of the illumination intended only for the prompting material will be reflected into the lens and produce glare or halation in the picture. The present invention provides illumination for the prompting information only during the time interval between picture exposures and therefore the illumination intended for the information cannot cause any interference with the picture.

One of the objects of this invention is to provide an improved prompting device which avoids one or more of the disadvantages and limitations of prior art arrangements.

Another object of the invention is to provide a prompting device which permits a speaker to look at prompting information at the same time he is focusing his eyes on the camera lens.

Another object of the invention is to enable a speaker posing before a camera to read prepared information which is focused in a focal plane substantially coincident with the camera lens.

Another object of the invention is to provide a brightly illuminated script or placard adjacent to the camera without causing any glare, reflection, or halation to appear in the picture.

Another object of the invention is to permit a speaker positioned before a camera to see his own image while looking at the camera lens.

One feature of the invention includes a system of illumination for graphic information which is controlled by the camera. The camera generates an electrical signal during the time interval between intermittent picture exposures and this signal is used to actuate a lighting means and illuminate the information only during the time interval.

For a better understanding of the present invention, together with other and further objects thereof, reference is made to the following description taken in connection with the accompanying drawings.

Fig. 1 is a side view of a camera and a prompting device.

Fig. 2 is a front view of a portion of the prompting device showing how graphic information may be directly illuminated.

Fig. 3 is a cross sectional view of an illuminating box showing how graphic information may be illuminated by transmitted light.

Fig. 4 is a side view similar to Fig. 1 with some parts in section and illustrating an alternate method of producing an illuminated source of information which may vary in size.

Fig. 5 is a plan view of a portion of the apparatus shown in Fig. 4, showing a device for controlling a projection lens.

Figure 6:
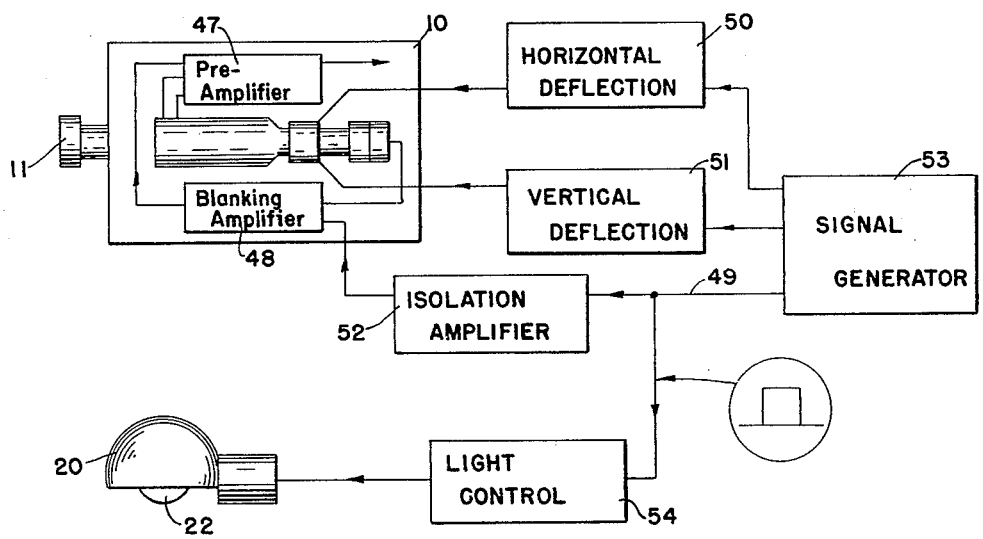
Fig. 6 is a schematic diagram of connections of a television camera showing some of the various circuit components in block form and showing the method of connecting the light control circuit.

Referring now to Figs. 1 and 2, a television camera 10 is supported on a tripod 12 and a base 13. A transparent semi-reflecting mirror 14 is mounted in front of a lens housing 11 and is inclined at an angle to the line of sight between the person 15 and the lens. Directly below mirror 14 a placard 16 is mounted containing graphic information useful to the person. The placard 16 may be rolled from one storage spool 17 to a second spool 18. Illumination for the graphic information is supplied by lamps 22 housed in one or more reflectors 20 supported by brackets 21. Lamps 22 are preferably of the gaseous discharge type since these lamps may be turned on and off in a very short time interval. However, any form of flash lamp may be used which may be pulsed quickly and produces no after-glow. The graphic information 16 is mounted on a stand 23 which is secured to base 13. The base may be mounted on rollers or other suitable mobile equipment so that its position with respect to the person 15 may be varied by the operator.

The above described apparatus will produce a virtual image of the placard information which is substantially coincident with the lens position and will enable the person to read the information on the placard by looking directly at the lens. It may also be advantageous for the person to see his own likeness superimposed on the graphic information and to this end a second semi-reflecting mirror 24 is mounted adjacent to placard 16 and positioned at an angle which will reflect the person's face back along the line of sight.

As is well-known, the television cameras now in use record and transmit pictures in an intermittent fashion. By the use of a scanning beam a picture is recorded during a certain time interval, then a blanking pulse is applied to the camera during the retrace or repositioning of the scanning means. During the time interval the blanking pulse is transmitted, light-sensitive elements within the camera are disconnected from the picture transmitting circuits and it is during this time interval that lamps 22 are operated to produce high intensity illumination on the placard 16.

It will be obvious that any means of strong illumination at a point adjacent to the camera will necessarily produce reflections and diffuse illumination in areas near the camera and the person. These reflections, unless completely shielded, may be picked up by the camera lens and produce unnatural lighting effects in the picture which are undesirable. By confining the lighting cycle to the time interval between intermittent pictures such reflections are eliminated and the normal lighting of the person and the surroundings produces the only light which the television camera will receive and transmit during an active picture taking cycle.

The light box shown in Fig. 3 includes a container 25, lamps 22, a translucent or transparent supporting means 26 and the placard 16. This type of illuminating device can be used where the placard is semi-transparent and contains graphic information on one side only. The container 25 helps materially to eliminate annoying reflections which might otherwise hamper the camera operators.

Figs. 4 and 5 illustrate a device which may be used when the camera is moved a comparatively great distance toward and away from the person who is speaking. In such case the graphic information should be compressed to a small area when the camera is close to the person and enlarged to a much greater area when the camera is moved away from the person. In this manner the script will be retained within an angle of view which is substantially constant and still retain the same readability. In order to accomplish this result the graphic information is printed on a transparent or translucent film 27 which may be dispensed from a storage spool 28 and wound on another storage spool 30. The film is illuminated by a lamp 22 which may be used in conjunction with a condensing lens 31. The lamp, condensing lens, and film 27 are all enclosed in a box 32 which is mounted on base 13. Light rays passing through film 27 are focused by a lens in a lens housing 33 after being reflected by a prism or mirror 34. The lens focuses the light from the film 27 onto a translucent screen 35 which is mounted directly below the semi-reflecting mirror 14. The size of the image on screen 35 is controlled by a gear 36 which meshes with a gear 37 secured to the lens housing. The lens within housing 33 is a type of lens which retains its sharpness of focus on the screen 35 while its components are moved relative to each other in order to change the size of the projected image. Several types of such lenses have been described and are well-known, one such type being called a "Zoomar" lens.

Gear 36 is secured to a shaft 40 which is in turn secured to a lever 41 (see Fig. 5). Lever 41 may be supplied with a cam follower roller 42 which is resiliently pressed against a cam surface 43 mounted directly under the camera base 13 and secured to a track 44 on which the camera must be moved. As the camera is moved toward or away from the speaker, cam face 43 positions lever 41 and gear 36 so that the lens in housing 33 changes the size of the image on screen 35 to maintain a constant angle of view as seen by the speaker.

Figure 7:
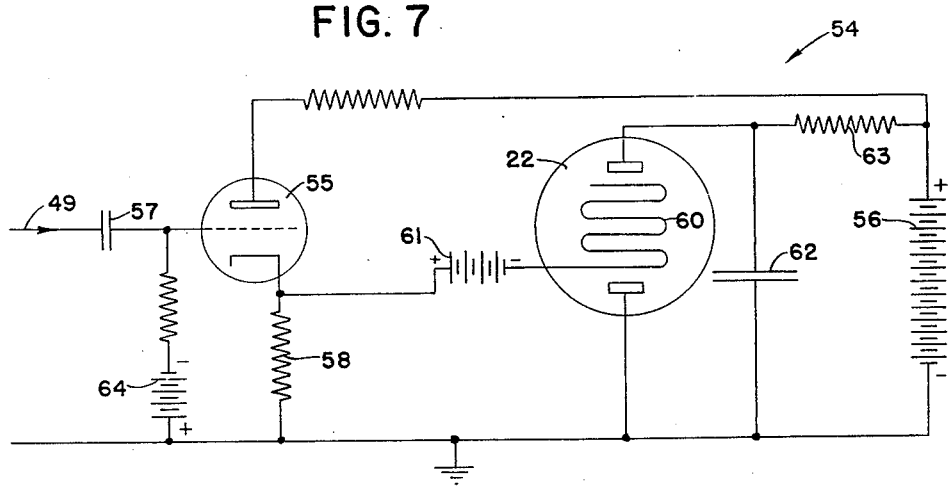
Fig. 7 is a detailed schematic drawing of the light control circuit shown in block form in Fig. 6.

Figs. 6 and 7 illustrate the method of connecting lamps 22 to a television circuit so that the lamp will be lighted only during the time interval between pictures. The details of the television circuit are not shown because such details are well-known and have been described in many publications. One such publication is "Principles of Television Engineering," by Donald G. Fink, first edition, pages 388 to 413, published by McGraw-Hill Book Company, New York, in 1940. The television circuit includes a pre-amplifier 47 and a blanking amplifier 48 mounted within the camera housing 10. External of the camera housing is a horizontal deflection circuit 50, a vertical deflection circuit 51, and an isolation amplifier 52. These circuits are supplied with signals which are generated by a synchronizing signal generator 53. Generator 53 generates a square topped positive blanking pulse which is transmitted over conductor 49 to isolation amplifier 52 and blanking amplifier 48 and causes the camera circuits to be insensitive to light during the time interval between pictures.

A light control circuit 54 is connected to the conductor 49 which transmits the blanking pulse from generator 53 to amplifier 52 and contains the detailed equipment shown in Fig. 7. The light control circuit includes an amplifier tube 55 which may be a triode and a source of potential 56 which may be of the order of several hundred volts. The control electrode of tube 55 is connected to the signal generator 53 in series with a blocking capacitor 57. The cathode of tube 55 is connected in series with a cathode resistor 58 which may be of the order of 3,000 ohms. If lamp 22 is of the type which contains gas and two discharge electrodes it may be fired by a control electrode 60 which is connected to the cathode of tube 55 in series with a biasing source of potential 61. Source of potential 56 is also connected to the discharge electrodes of lamp 22 and the circuit may include a storage capacitor 62 and a charging resistor 63.

The operation of the light control circuit is as follows: During the time a picture is being transmitted the source of potential 56 charges capacitor 62 through the resistor 63 but the lamp does not produce illumination because its control electrode 60 is biased at a negative potential. During this time, tube 55 does not conduct because its control electrode is also biased by a biasing source of potential 64. When the blanking pulse is transmitted by generator 53, tube 55 is made conductive and the anode-cathode current which passes through the tube and through resistor 58 sends a positive pulse to control electrode 60, firing the lamp 22, and producing a brilliant flash of light. The flash of light is temporary and exists for a short time only because the source of potential 56 acting in series with resistor 63 is not sufficient to keep the lamp lighted.

The blanking pulse is generated 60 times each second in the modern system of television broadcasting and therefore the lamp 22 will be flashed 60 times each second and present a steady field of illumination to the speaker because of the well-known retention of vision of the human eye.

While there have been described and illustrated specific embodiments of the invention, it will be obvious that various changes and modifications may be made therein without departing from the field of the invention which should be limited only by the scope of the appended claims.

What is claimed is:

1. A prompting device for use by a person facing an image forming lens on a camera arranged for intermittent picture exposures comprising, a transparent reflecting screen disposed between the lens and the person and inclined with respect to the line of sight between the lens and the person, said transparent screen having a partially reflecting surface exposed toward the person, graphic information positioned out of the range of the lens but within the range of the reflecting screen, and control means for successively illuminating said graphic information during the time intervals between said exposures.

2. A prompting device for use by a person facing an image forming lens on a camera arranged for intermittent picture displays comprising, a transparent reflecting screen disposed between the lens and the person and inclined with respect to the line of sight between the lens and the person, said transparent screen having a partially reflecting surface exposed toward the person, graphic information positioned out of the range of the lens but within the range of the reflecting screen, lighting means for the graphic information, control means for successively actuating the lighting means, and means connected to the camera and to the control means for activating the control means in response to a signal transmitted during a time interval between picture displays.

3. A prompting device for use by a person facing an image forming lens on a camera arranged for intermittent picture exposures comprising, a transparent reflecting screen disposed between the lens and the person and inclined with respect to the line of sight between the lens and the person, said transparent screen having a partially reflecting surface exposed toward the person, graphic information positioned out of the range of the lens but within the range of the reflecting screen, lighting means for successively illuminating said graphic information, circuit means coupled to said camera which generates an electrical signal during the time interval between the intermittent picture exposures, and control means for actuating the lighting means by said signal.

4. A prompting device for use by a person facing an image forming lens comprising, a first transparent reflecting screen disposed between the lens and the person and inclined with respect to the line of sight between the lens and the person, said transparent screen having a partially reflecting surface exposed toward the person, graphic information positioned out of the range of the lens but within the range of the first reflecting screen, a second transparent reflecting screen interposed in the line of sight of said person and having a semi-reflecting surface which reflects the image of the person, the combination of the first and second reflecting screens creating coextensive virtual images of the person and the graphic information visible along the line of sight between the person and the image forming lens, and control means for successively illuminating said graphic information during a time interval between said intermittent picture exposures.

5. A prompting device as set forth in claim 2 wherein said control means coupled to said camera comprises a connection to a signal generator and transmits a blanking signal which disables the camera during the time interval between pictures.

6. A prompting device as set forth in claim 5 wherein said blanking signal is applied to an electronic amplifier circuit which is connected to said lighting means.

7. A prompting device as set forth in claim 3 wherein said lighting means includes a gaseous discharge lamp.

8. A prompting device as set forth in claim 5 wherein said graphic information is focussed on a viewing screen by an adjustable lens, said lens adjustable by a cam to vary the magnification and maintain a substantially constant angle of view to said person.

References Cited in the file of this patent

UNITED STATES PATENTS

| | | |
|---|---|---|
| 2,393,316 | Edgerton | Jan. 22, 1946 |
| 2,420,198 | Rosenthal | May 6, 1947 |

FOREIGN PATENTS

| | | |
|---|---|---|
| 1,102,136 | France | May 4, 1955 |